United States Patent [19]

Bourner et al.

[11] Patent Number: 5,458,206
[45] Date of Patent: Oct. 17, 1995

[54] POWER TOOL AND MECHANISM

[75] Inventors: Michael D. Bourner; Richard L. Jones, both of Durham, United Kingdom

[73] Assignee: Black & Decker Inc., Newark, Del.

[21] Appl. No.: 206,488

[22] Filed: Mar. 4, 1994

[30] Foreign Application Priority Data

Mar. 5, 1993 [GB] United Kingdom ............... 9304540

[51] Int. Cl.⁶ .................................................. B25B 23/159
[52] U.S. Cl. ............................. 173/178; 173/48; 173/104
[58] Field of Search ................................ 173/48, 178, 104, 173/109

[56] References Cited

U.S. PATENT DOCUMENTS

| | | |
|---|---|---|
| 865,486 | 9/1907 | Gannon . |
| 2,238,583 | 4/1941 | Dodge . |
| 2,764,272 | 9/1956 | Reynolds . |
| 2,968,960 | 1/1961 | Fulop . |
| 3,252,303 | 5/1966 | Weasler et al. . |
| 3,430,708 | 3/1969 | Miller . |
| 3,730,281 | 5/1973 | Wood . |
| 3,736,992 | 6/1973 | Zander et al. . |
| 3,799,276 | 3/1974 | Plattenhardt . |
| 3,955,628 | 5/1976 | Grözinger et al. . |
| 4,098,351 | 7/1978 | Alessio . |
| 4,215,594 | 8/1980 | Workman, Jr. et al. . |
| 4,366,871 | 1/1983 | Dieterle et al. . |
| 4,489,792 | 12/1984 | Fahim et al. . |
| 4,522,270 | 6/1985 | Kishi . |
| 4,567,950 | 2/1986 | Fushiya et al. . |
| 4,823,885 | 4/1989 | Okumura . |
| 4,895,212 | 1/1990 | Wache ......................... 173/48 |
| 4,898,249 | 2/1990 | Ohmori . |
| 4,986,369 | 1/1991 | Fushiya et al. . |
| 5,005,682 | 4/1991 | Young et al. . |
| 5,025,903 | 6/1991 | Elligson . |
| 5,159,986 | 11/1992 | Höser ......................... 173/48 |

FOREIGN PATENT DOCUMENTS

| | | |
|---|---|---|
| 0399714 | 11/1990 | European Pat. Off. . |
| 1478982 | 1/1970 | Germany . |
| 2438814 | 3/1976 | Germany . |
| 2715682 | 10/1978 | Germany . |
| 4004464 | 1/1991 | Germany . |
| 4038502 | 6/1992 | Germany . |
| 405191 | 12/1965 | Switzerland . |
| 1346537 | 2/1974 | United Kingdom . |
| 1366572 | 9/1974 | United Kingdom . |

*Primary Examiner*—Scott A. Smith
*Attorney, Agent, or Firm*—Dennis A. Dearing; John D. Del Ponti; Charles E. Yocum

[57] ABSTRACT

A power tool has an application mechanism (300) for connection to the output of an epicyclic gearbox provided with a torque control ring. The mechanism has a body (310) journalling a chuck spindle (302). Outside the body is a clutch control arrangement comprising balls (334,336) pressed against the torque control ring by individual springs (330) controlled by a control ring (322) threaded on the body. The mechanism includes a hammer arrangement having rotary and fixed ratchet plates (378,376) and cam ring (308) operable to engage and separate the plates by a lever (360) which projects between the springs (330).

10 Claims, 7 Drawing Sheets

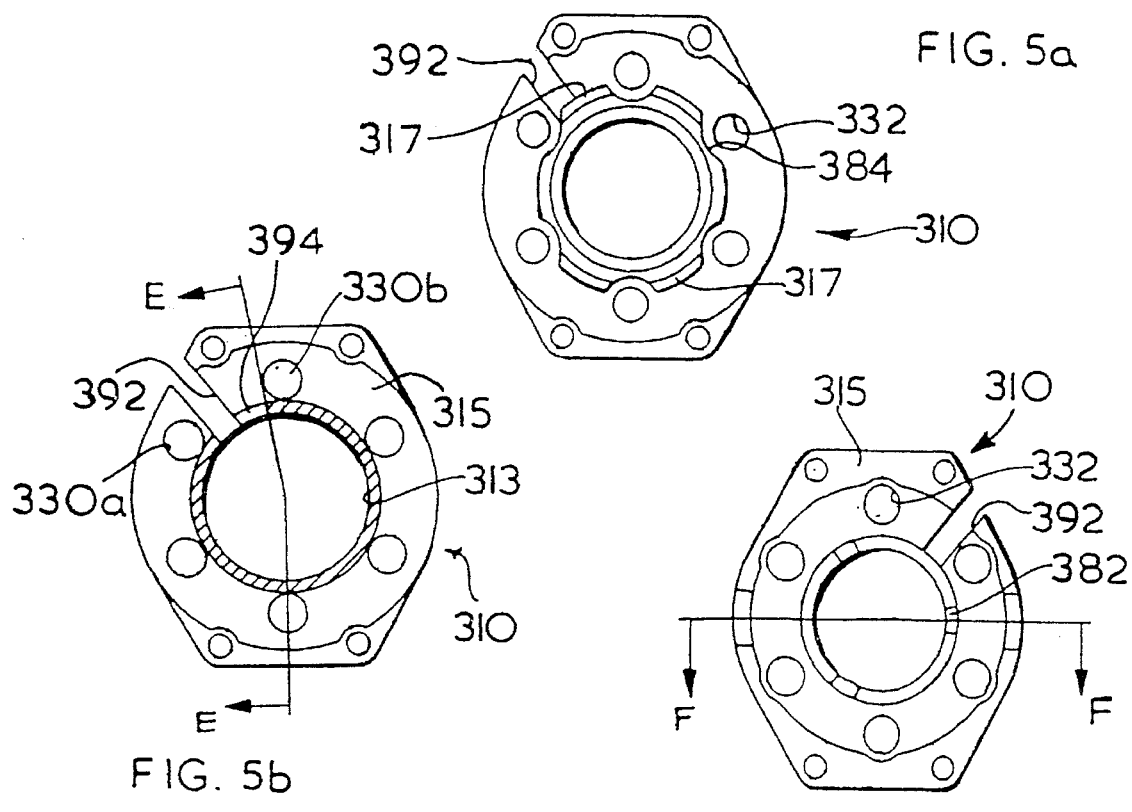
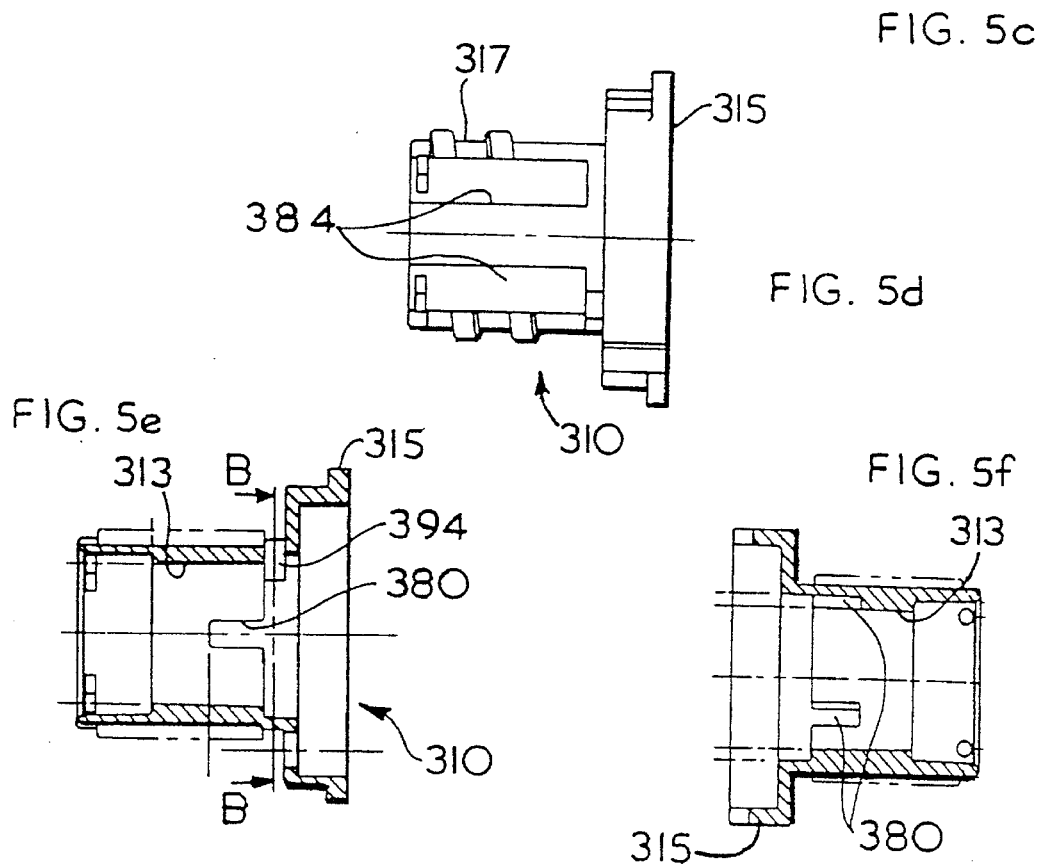

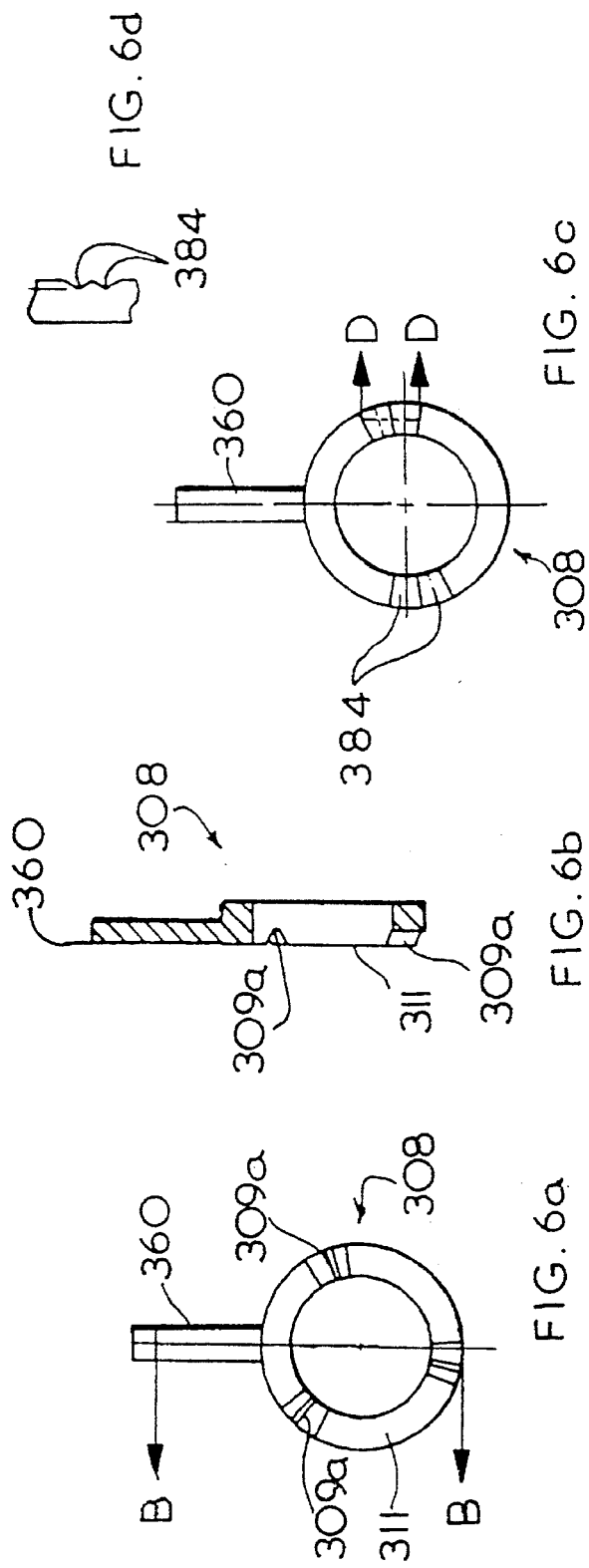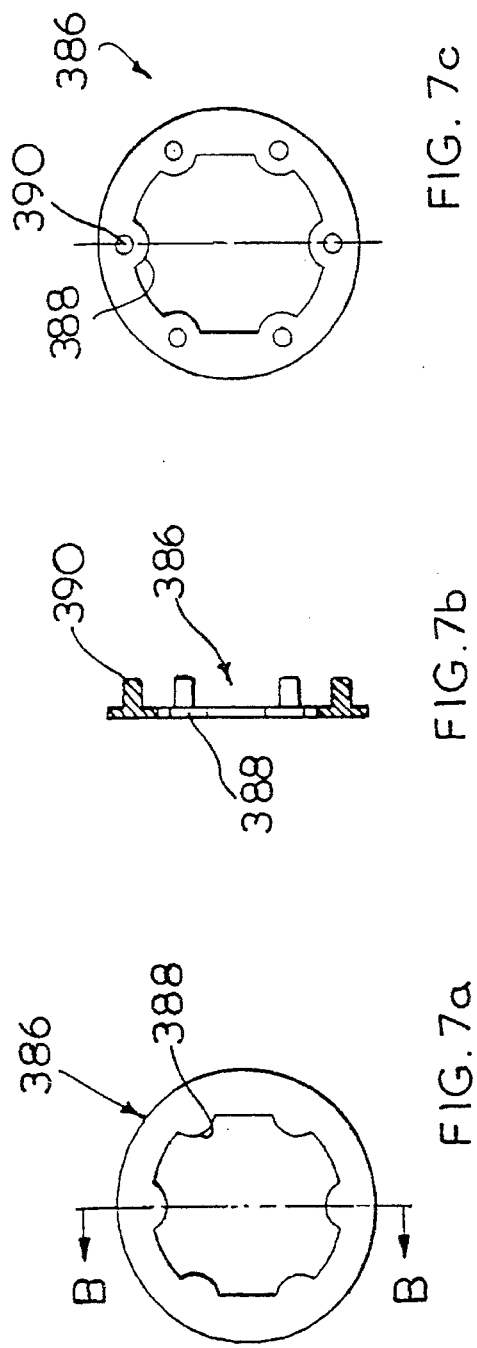

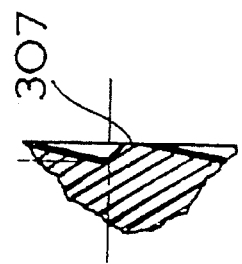
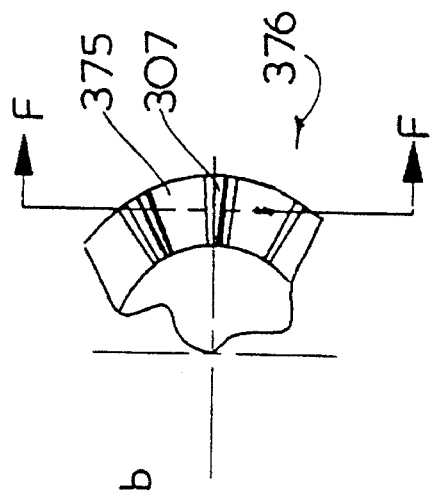
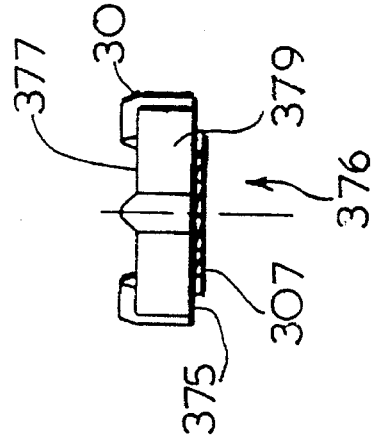
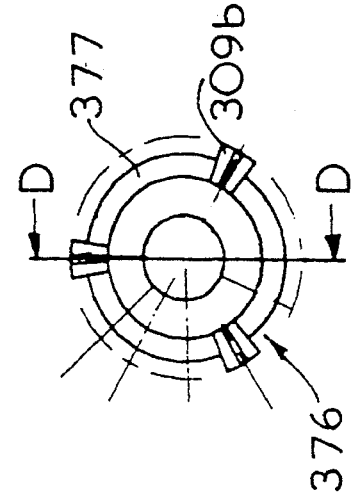
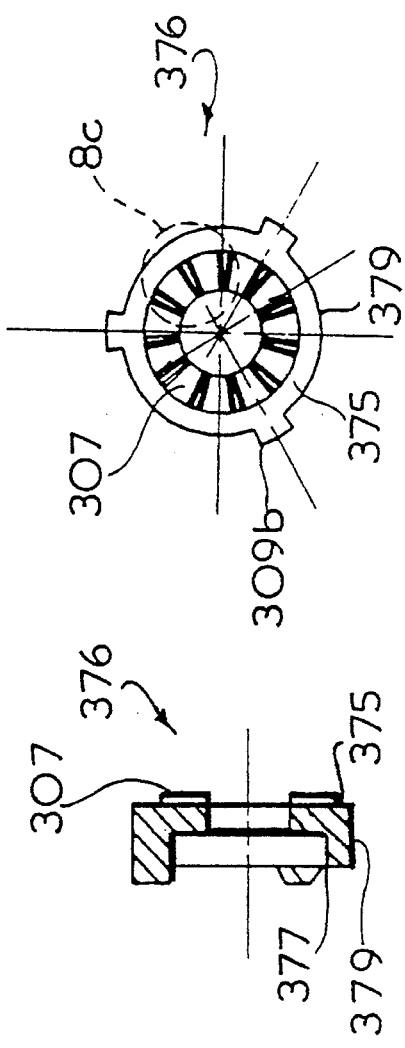

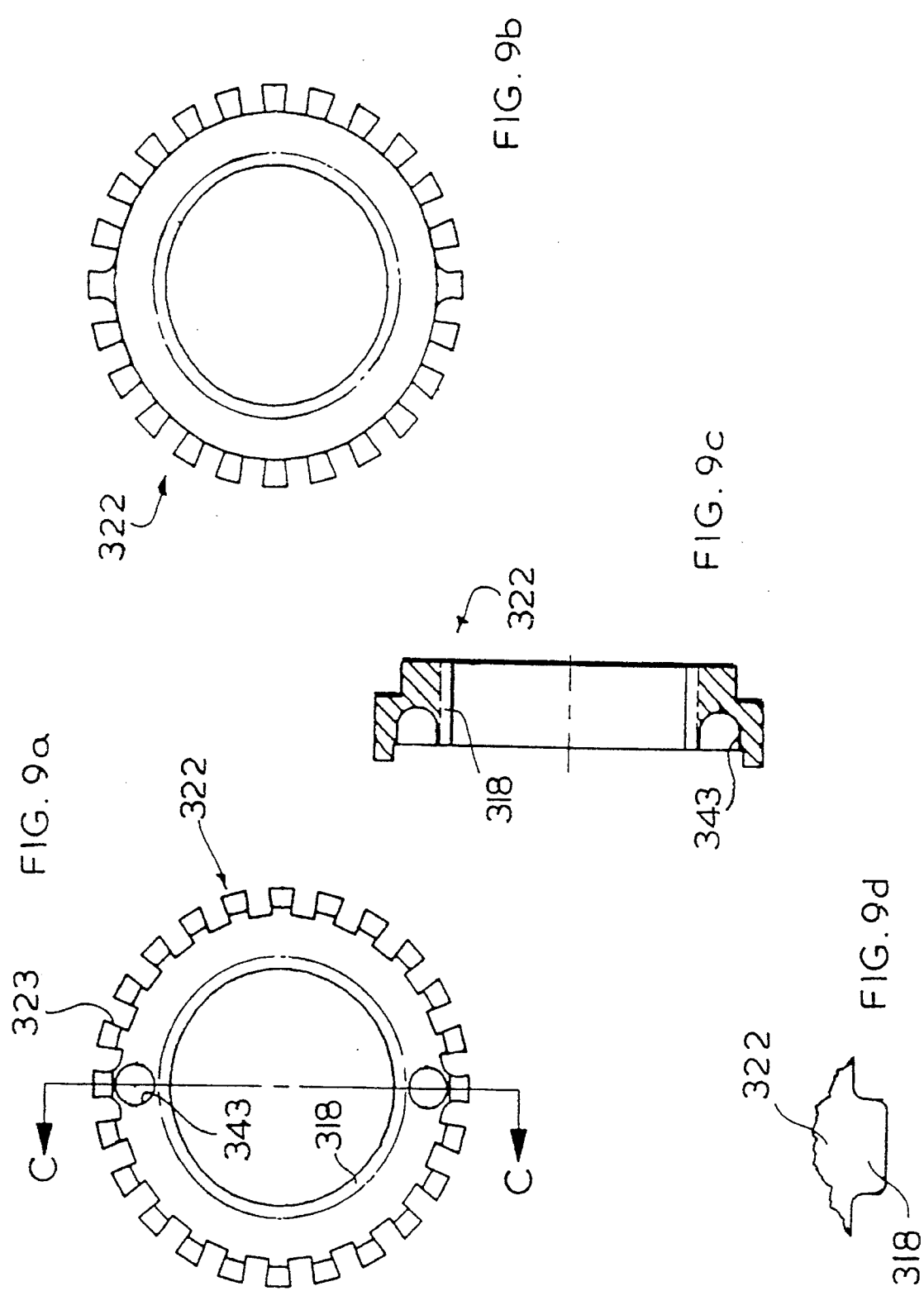

POWER TOOL AND MECHANISM

CROSS REFERENCE TO RELATED APPLICATION

U.S. application Ser. No. 08/206,570, filed Mar. 4, 1994 in the names of Michael David Bourner and Richard Llewelyn Jones is directed to and claims a chuck spindle device having a torque control clutch, a hammer mechanism or both as disclosed in the subject application.

BACKGROUND OF THE INVENTION

This invention relates to power tools and particularly to an application mechanism for a power tool of the type comprising a housing, a motor mounted in said housing, a gearbox having an input end mounted on said motor and an output end adjacent an aperture in the housing, the gearbox being epicyclical and including a torque control ring which, when held stationery with respect to said housing, permits the gearbox to transmit torque and which, when permitted to rotate in the housing, disables torque transmission by the gearbox.

In such power tools it is known to dispose an application mechanism on the output end of the gearbox, which mechanism comprises a resiliently biased, adjustable actuating means mounted on said body to selectively engage said torque control clutch ring.

Adjustment of the actuating means varies the engagement with said torque control clutch ring thereby varying the torque at which it begins to slip and at which transmission by the gearbox to its output shaft is stopped.

It is also known to lock the torque control ring so that it is not employed and so that no torque limitation is provided. In this instance, it is also known to dispose an application mechanism on the output end of the gearbox, which mechanism comprises a hammer arrangement whereby oscillating axial vibration can selectively be imposed on the rotary drive supplied by the gearbox.

Finally, it is also known from DE 4038502 to provide an arrangement as first described above, i.e. a tool having a torque control mechanism mounted on the output end of the gearbox, but where a hammer mechanism is added on the front end of the torque control mechanism. Such an arrangement is versatile because it can be employed in various different ways. However, it suffers from being somewhat long having first a motor, then a gearbox, then a torque control mechanism, then a hammer mechanism, all one after the other.

It is also known to employ electronic torque control whereby the torque applied is fed back to an electronic control module and, if the applied torque exceeds the torque preset in the control module, power is disconnected from the motor. Thus if a hammer mechanism is on the front of the gearbox there is no penalty in terms of compactness in providing both torque control and a hammer facility but, of course, the electronics do add cost and complexity.

It is therefore, an object of the present invention to provide a power tool which has this versatility and yet remains compact but which is still simple and relatively inexpensive.

BRIEF DESCRIPTION OF THE INVENTION

In accordance with the present invention there is provided a power tool comprising a housing, a motor mounted in said housing, a gearbox having an input end mounted on said motor and an output end adjacent an aperture in the housing, the gearbox being epicyclical and including a torque control ring which, when held stationery with respect to said housing, permits the gearbox to transmit torque and which, when permitted to rotate in the housing, disables torque transmission by the gearbox; and an application mechanism driven by said gearbox, which mechanism comprises:

a) a substantially cylindrical hollow body;

b) a chuck drive spindle journalled in said body and defining therebetween an annular space;

c) means limiting axial movement of said spindle in said body towards said gearbox;

d) a rotary ratchet plate fixed on said spindle;

e) a facing fixed ratchet plate in said body;

f) means to engage said ratchet plates together such that on rotation of the spindle a reciprocating action is imposed thereon, said means including a lever projecting through a slot in said body;

g) resiliently biased, adjustable actuating means mounted on said body to selectively engage said torque control clutch ring, said lever projecting through said actuating means.

BRIEF DESCRIPTION OF THE DRAWINGS

The invention is further described hereinafter, by way of example only, with reference to the accompanying drawings, in which:

FIGS. 5a through f are different views of the mechanism body: a is a front view, b is a section on the line B—B in FIG. 5e, c is a rear view, d is a side elevation, e is a section on the line E—E in FIG. 5b, and f is a section on the line F—F in FIG. 5c;

FIGS. 6a through d are different views of a hammer cam ring: a is a front view, b is a section on the line B—B in FIG. 6a, c is a rear view, and d is a part section on the line D—D in FIG. 6c;

FIGS. 7a through c are different views of a spring support ring: a is a front view, b is a section on the line B—B in FIG. 7a, and c is a rear view;

FIGS. 8a through f are different views of a hammer fixed ratchet: a is a rear view, b is a side elevation, c is detail 8c in FIG. 8e, d is a section on the line D—D in FIG. 8a, e is a front view, and f is a part section on the line F—F in FIG. 8c; and, FIGS. 9a through d are different views of a clutch preset ring: a is a front view, b is a rear view, c is a side section on the line C—C in FIG. 9a, and d is a detail of the thread formation 318 in FIG. 9c.

DETAILED DESCRIPTION OF THE DRAWINGS AND EMBODIMENT

Figure 1:
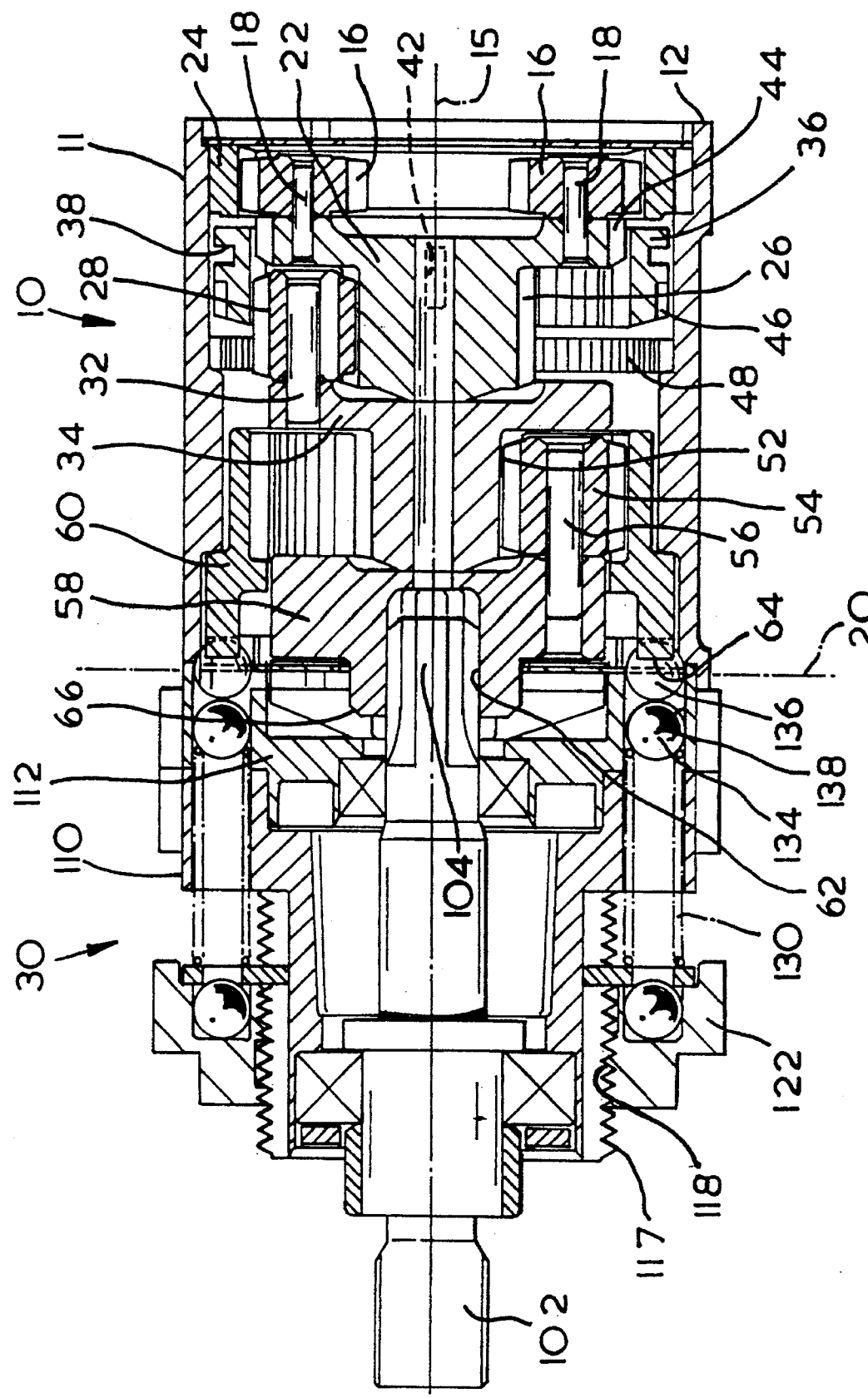
FIG. 1 is a side section through a gearbox and torque control clutch of the type to which the present invention relates.

In FIG. 1, a gearbox 10 drives a torque control clutch mechanism 30 to which it is connected at interface 20. Interface 20 is the output end of the gearbox and input end of the mechanism 30. Input end 12 of the gearbox 10 is connected to a motor (not shown) which has a spur gear (not shown) meshing with first stage planet gears 16 of the gearbox 10.

Planet gears 16 are journalled for rotation about their axes 18 on a first stage carrier 22. A planet ring 24 is fixed in housing 11 of the gearbox 10. The planet ring 24 has internal gears which mesh with the planets 16. Thus as the spur gear rotates the planets 16, they in turn are obliged to rotate about central axis 15 running around planet ring 24. In so-doing, first stage carrier 22 rotates about axis 15 at some speed less than the speed of rotation of the input spur gear. Hence a first speed reduction is achieved.

The carrier 22 has its own spur gear 26 driving second stage planets 28. Planets 28 are likewise journalled for rotation about their own axes 32 on a second stage carrier 34. A second stage planet ring 36 has internal gears for meshing with the second stage planets 28.

However, the second planet ring 36 has two axial positions giving different results. It has an external circumferential groove 38 into which project fingers (not shown) of a gear selector (through windows 42 of the housing 11) in order to shift the planet ring between its two positions when the gear selector is operated.

In the position shown in FIG. 1, the ring 36 is in its high speed position where its gear teeth mesh with teeth 44 formed around the outside of first stage carrier 22. Thus the ring 36 is locked on the carrier 22 and rotates with it. Thus the planets 28 do not rotate about their own axes but merely transmit the rotation of the first stage carrier 22 directly to the second stage carrier 34 with no speed reduction.

If, however, the ring 36 is shifted leftwardly in the drawing to its low speed position, its teeth are disengaged from the first stage carrier 22. However, on disengagement therefrom, teeth 46 on the outside of the ring 36 engage corresponding teeth 48 in the housing 11 so as to lock the ring 36 in the housing 11. Now, not only are the planets 28 free to rotate about their axes 32, they are positively obliged to by their engagement with the teeth of the, now stationary, planet ring 36. Thus the planets 28 also orbit about axis 15 transmitting reduced speed drive to the second stage carrier 34.

Finally, the carrier 34 likewise has a spur gear 52 which drives third stage planets 54. The planets 54 are journalled for rotation about their own axes 56 on an output carrier 58. A clutch control ring 60 is the planet ring for the planets 54 and is selectively rotatable in the housing 11. It is normally stationary in the housing 11 and consequently drive from the spur gear 52 is transmitted through the planets 54 to the output carrier 58. The torque applied to the carrier 58 is equal to the torque applied to the control ring 60. Thus, if the ring 60 is allowed to slip, zero torque is applied to the carrier. The degree to which the ring 60 is allowed to slip is the principle behind the torque control of this mechanism.

Clutch mechanism 30 shown in FIG. 1 is employed to exercise the control of the slippage of control ring 60. The mechanism comprises a housing body 110 in which is journalled a chuck spindle shaft 102. The shaft 102 extends through an end cap 112 and has a spined end 104 which engages a correspondingly splined bore 62 of the output carrier 58.

The housing body 110 has a threaded surface 117 adapted to receive corresponding threads 118 on a clutch preset ring 122. Clutch ring 122 presses springs 130 against clutch balls 134,136 received in bores 138 disposed around the end cap 112. The balls 136 engage a castellated surface 64 of the control ring 60. If the torque on the control ring is sufficient, the balls 136 ride over the castellations 64 and the ring spins removing drive to the chuck spindle shaft 102. By rotating the clutch ring 122, the springs 130 can be compressed increasing the torque required before the balls ride over the castellations, and hence the torque limit applied to the shaft 102.

A more detailed description is now given with reference to the remaining drawings showing a combination mechanism 300 according to the present invention.

Figure 2:
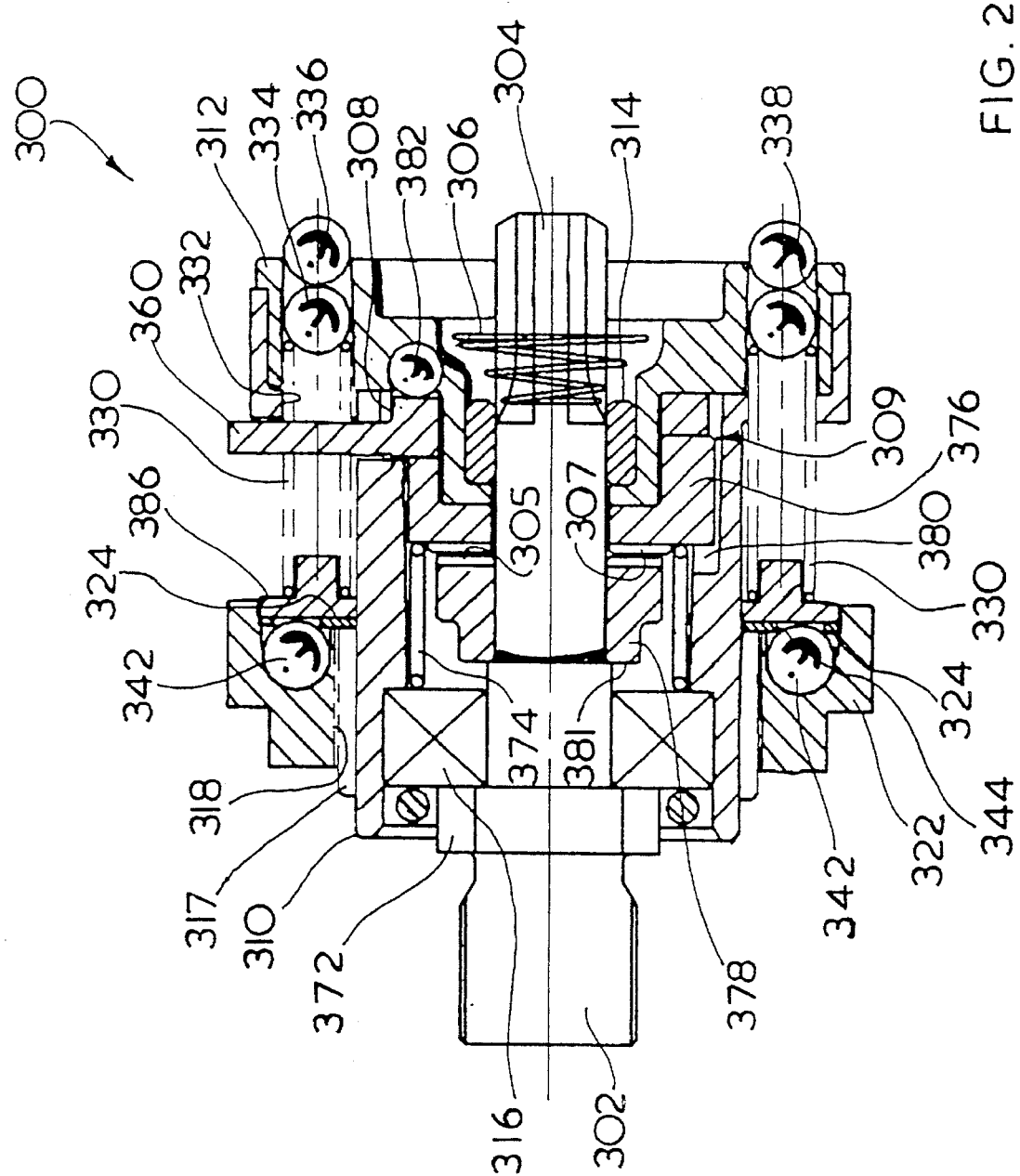
FIG. 2 is a side section through a combination mechanism according to the present invention.

In FIG. 2, a mechanism 300 has a housing body 310 mounting through a front bearing 316 a chuck spindle shaft 302. An end cap 312 closes the other end of the housing and has a bearing bush 314 mounting the input end 304 of the spindle 302. This end 304 is splined for driving connection with a gearbox (not shown in this drawing) and has a preload spring 306 serving to preload both the gearbox and the mechanism 300; the latter by pressing the shaft 302 leftwardly in the drawing. The spring 306 presses against shoulder 66 of the output carrier 58 (see FIG. 1).

FIG. 2 shows the position of the spindle 302 in the body 310 that is adopted when pressure is applied by the user through the housing of the tool (neither shown) and pressing a tool bit (not shown) mounted on the end of spindle 302 against a workpiece. Thus a flange 372 on the spindle 302 abuts the bearing 316 preventing further rightward travel.

A spring 374 presses a fixed ratchet 376 against a cam ring 308 which has an externally operable knob 360. In the position shown, the cam ring allows sufficient rightward movement of the ratchet 376 for its ratchet teeth 307 to clear those 305 of a rotary ratchet 378 fixed on the chuck spindle shaft 302.

Cam ring 308 is shown in more detail in FIGS. 6a, b and c where it can be seen that it comprises a ring having cam notches 309a in one front surface 311. The rear surface thereof is provided with detents 384 referred to further below.

The cam notches 309a co-operate with cam knobs 309b on the fixed ratchet 376 shown in more detail in FIGS. 8a to f. The fixed ratchet 376 is annular, having front and rear surfaces 375, 377 respectively and an outer cylindrical surface 379. The outer cylindrical surface 379 is a close sliding fit in the body 310. The cam knobs 309b extend radially outwardly from the surface 379 and slide axially in slots 380 in the body 310 so that rotation of the ratchet 376 is precluded. The knobs 309b also extend axially beyond surface 377 and engage cam notches 309a of the cam ring 308. In this position, there is no hammer action.

If, however, the knob 360 is operated to rotate the cam ring 308 about its axis through a small angle, cams 309 disengage and press the fixed ratchet leftwardly in the drawings against the pressure of spring 374. Having moved the fixed ratchet leftwardly, its ratchet teeth 307 can now be reached by those on the rotary ratchet 378 when the latter is pressed rightwardly on user pressure on the tool bit. Until such time however, spring 306 presses the spindle 302 leftwardly until front surface 381 of the rotary ratchet 378 abuts the bearing 316. Here, even when the cam 308 is operated, the ratchets 307 do not engage so that, until the user engages the workpiece and moves the spindle rightwardly, the spindle rotates without reciprocation.

Ratchet teeth 307 are shown in FIGS. 8b to f and are formed on front surface 375 of the fixed ratchet 376. Ratchet teeth 305 on the rear surface of rotary ratchet 378 correspond.

However, when knob 360 is operated to move fixed ratchet 376 leftwardly in FIG. 2 and pressure on the drill chuck is applied to move chuck spindle 302 and its rotary ratchet 378 rightwardly in FIG. 2, ratchet teeth 305,307 engage one another and impart an oscillating axial movement on the chuck spindle 302 creating the hammer action which assists drilling certain materials such as masonry.

End cap 312 has two balls 382 seated facing the back surface 311 of ring 308 which has the two detents 384. The balls 382 snap into and out of engagement with the detents 384 when the knob 360 is operated to rotate the cam ring 308 between its two positions. There are thus two detents 384. The ring must move leftwardly slightly against the pressure of spring 374 in order to accommodate the balls 382 snapping into and out of the detents 384. No extra spring is required.

The combination mechanism 300 further comprises a torque control arrangement substantially as described above with reference to FIG. 1. The end cap 312 has a series of bores 338 around its periphery which each house a pair of clutch balls 334,336. These are pressed by individual clutch springs 330 which ultimately bear against a clutch ring 322 which has a coarse internal thread 318 which matches a corresponding thread 317 partially formed around the body 310.

Referring to FIGS. 5a to f, the body 310 is substantially cylindrical with a hollow bore 313 and a flanged rear end 315. Into the flanged end 315 fits the end cap 312. Bores 332 are formed in the flange 315 and these bores correspond in number and position with the bores 338 of the end cap 312.

The body 310 has a series of scallops 384 corresponding with each opening 332 of the body and which receive the springs 330. The scallops locate a metallic support ring 324 and a plastics guide ring 386. Both these elements have internal bulges 388 which enter the scallops 384 and prevent rotation of the rings 324,386 as the clutch ring 322 is turned. See FIGS. 7a to c for greater detail of the guide ring 386.

The clutch ring 322 mounts two balls 342 in openings 343 which snap into and out of engagement with a plurality of detent apertures 344 (see FIG. 2) spaced around the support ring 342. As the clutch ring is turned, the balls 342 press the rings 324,386 against the pressure of springs 330. Again, no separate springs are required for this detent feature. The guide ring 386 has a series of mounting pegs 390 which each locate one of the springs 330. This ensures that the springs remain in line.

The springs 330 press the balls 334,336 against control ring 60 in the epicyclic gearbox 10. If the gear ring is allowed to rotate in the gearbox, the gearbox ceases to transmit any torque to the spindle 304. Thus the more strongly the balls 336 are pressed against that ring, the greater the torque must be before it will be sufficient to turn the ring under the balls. Hence the possibility to tighten the pressure on the balls by screwing the clutch ring 322 onto the body 310 further compressing the springs 330. Indeed, in order to rotate, the control ring must lift the balls 334,336 to a small extent to climb the ramps or castellations on the control ring. It is possible to tighten the springs so much that they become coil bound and prevent any lift of the balls 334,336. In this instance, there is no torque limit beyond that capable of being generated by the motor and gearbox.

It is to be noted that the knob 360 of the hammer mechanism cam ring 308 extends between the springs 330. Indeed, a slot 392 is formed in the flange 315 of the body 310 to allow insertion of the ring 308 and this slot extends circumferentially in the appropriate axial position at 394 (see FIG. 5b) to provide the requisite arc of movement of the knob 360 between two springs (at 330a, 330b in FIG. 5b) to engage and disengage the cams 309.

Thus it can be seen that the combination of a clutch and hammer mechanism is achieved within essentially the same confines as a conventional clutch mechanism.

Figure 3:
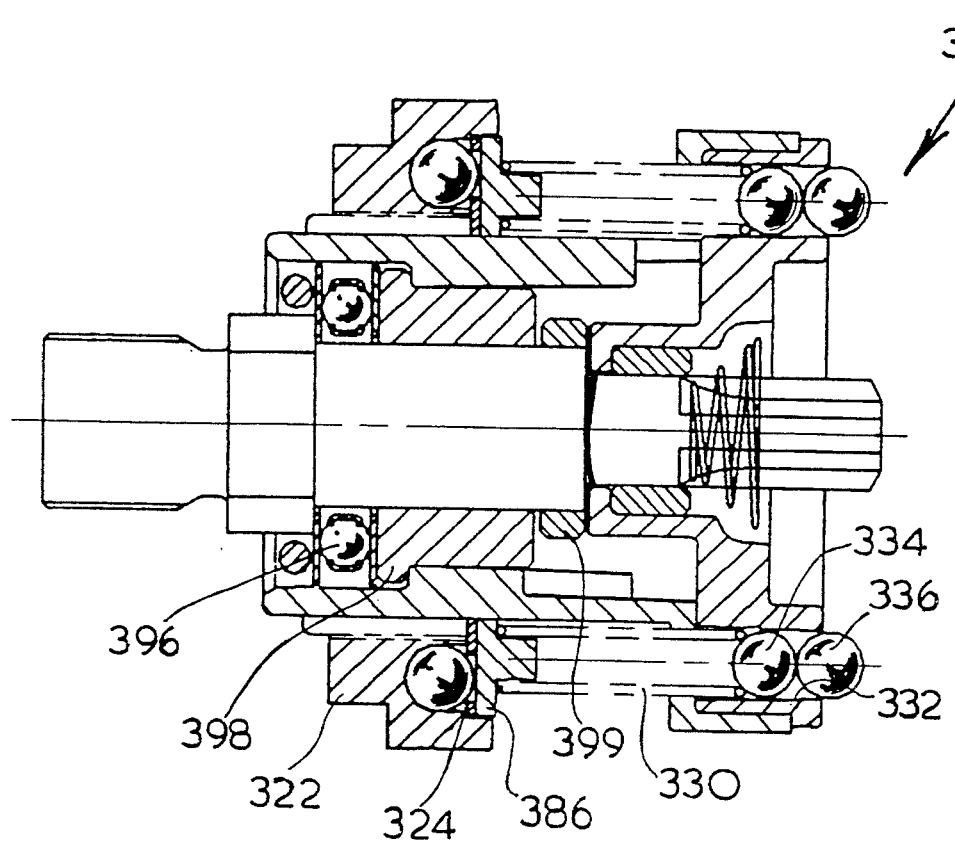
FIG. 3 is a side section through the mechanism of FIG. 2, adapted to have a torque control clutch feature only.

However, not only is this combination a first aspect of the present invention, but also there is the possibility to provide several different options using essentially the same components. Although not shown, the most basic mechanism for attachment to the gearbox of FIG. 1 is a straight transmission and this is similar to that shown in FIG. 3. This shows a simple clutch mechanism 300'. Because the hammer action is not required, the moderately expensive bearing 316 of FIG. 2 is replaced by a thrust ring 396 and bearing bush 398. The bush 398 is retained by press ring 399. While being cheaper, this arrangement is too long to accommodate the hammer mechanism.

To render this arrangement as a basic straight transmission, it is only a matter of removing the clutch ring 322, rings 324 and 386, springs 330 and balls 334,336. However, some arrangement needs to replace ball 336 to ensure that the control ring 60 is locked. This may comprise a ring of pegs or the like which fit in the bores 332 and protrude sufficiently to lock the ring.

Figure 4:
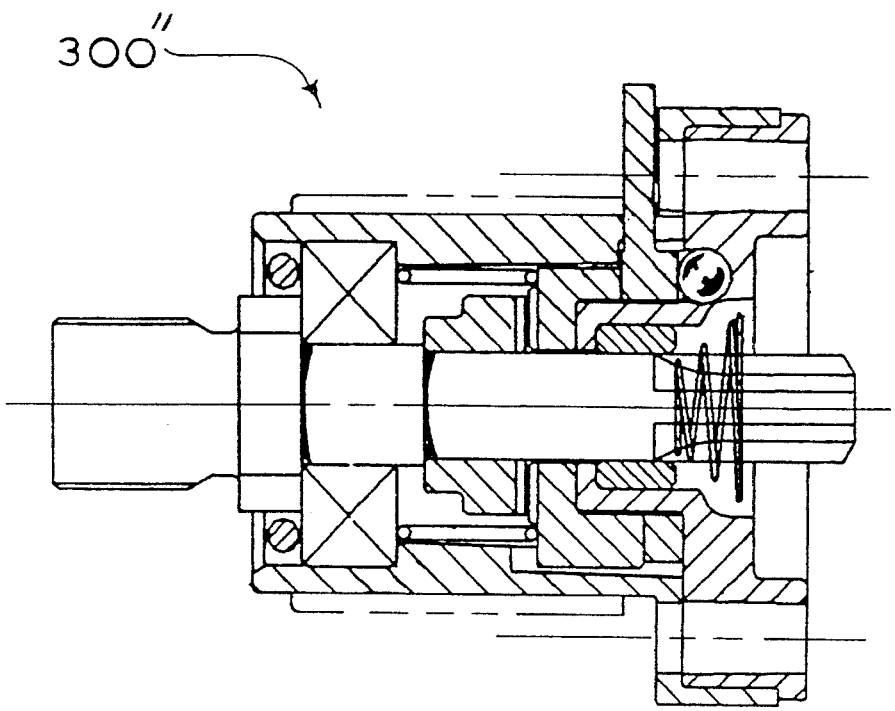
FIG. 4 is a side section through the mechanism of FIG. 2, adapted to have a hammer feature only.

Conversely, as shown in FIG. 4, it is likewise simple to render the mechanism 300 as a straight hammer mechanism 300". This is achieved by removing the components mentioned above relating to the clutch mechanism from the mechanism 300 of FIG. 2, although, again, some locking means is required for the clutch control ring 60 of the gear box 10.

Thus using essentially the same components, four options for an application mechanism to be connected to the gearbox 10 can be envisaged: that is to say, firstly, a straight transmission offering no features other than minimum cost; secondly, a clutch mechanism simply by the addition of several components; thirdly, a hammer mechanism, by exchange of some components of the straight transmission and the addition of a few others; and fourthly, a combination mechanism offering both hammer and clutch facilities, achieved by adding the clutch components to the hammer mechanism.

It is to be borne in mind that all these options are available in a particularly cost effective manner if the housings for the power tools including these components are terminated at the interface 20 between the gearbox and mechanism and if a nose ring is connected to that housing at the interface and wherein the nose ring is adapted for the particular mechanism. Thus where the mechanism is a straight transmission, the nose ring is nothing more than an extension of the housing. Where the mechanism is the simple clutch mechanism, the nose ring is arranged rotatable in the housing and is connected to the clutch ring 322 (by interaction with castellations 323, for example, on the clutch ring 322) so as to enable turning of the clutch ring and axial sliding thereof inside the nose ring. Where the mechanism is a simple hammer mechanism, the nose ring is rotatable between two positions and connected to knob 360. Finally, in the combination mechanism, two axially disposed nose rings are used, the rear most one operating knob 360 as mentioned above, and the second, front nose ring being rotatable on the rear nose ring and operating the clutch control ring 322.

Alternatively, and this is preferred, a single nose ring is employed to control both the knob 360 and the clutch ring 322. Here a spring is disposed in the end cap 312 to urge the knob 360 towards its non-hammer mode position. A ledge in the nose ring abuts the knob 360 and moves it towards its hammer mode position.

The spring is conveniently a single coil in a radial plane in the end cap with one end bent axially backwards into a hole in the end cap and the other next to the knob 360 holding it in its non-hammer mode position. The knob 360 and threads 317,318 are arranged so that movement of the knob to its hammer mode position is in the same direction as required for tightening of the clutch control ring 322 on the body 310.

Thus, in operation, one ledge in the nose ring abuts the knob 360 on the same side as the spring and prevents the nose ring being rotated further in that direction. In this non-hammer mode position, the knob 360 cannot move further in that direction because it abuts one edge of the slot 394 in the body 310. Also in this position, the control ring 322 is arranged at its loosest position, that is to say, most separated position with respect to the end cap 312.

If the nose ring is now rotated in the opposite direction, the ledge leaves the knob 360. The control ring 322 progressively tightens through progressively increasing torque transmission modes. Finally, a position is reached when the springs 330 do not allow balls 336 to raise sufficiently from the gear ring 60 to permit any rotation thereof. Here the nose ring indicates that the tool is in drill mode. Also in this position, the ledge (or another one) abuts the other side of the knob 360 remote from the spring. Thus a final twist of the nose ring turns the knob 360 against the pressure of the spring to its hammer mode position.

This sequence and arrangement is of course possible because in both drilling and hammer modes of operation of a power tool, there is no requirement for torque control. Similarly, in screw-driving mode (where torque control is of course useful) there is no need for the hammer action.

We claim:

1. A power tool comprising a housing, a gearbox having an input end capable of being mounted on a motor and an output end adjacent an aperture in the housing, the gearbox being epicyclic and including a torque control ring which, when held stationary with respect to said housing, permits the gearbox to transmit torque and which, when permitted to rotate in the housing, disables torque transmission by the gearbox; and an application mechanism driven by said gearbox, said mechanism comprises:
   a) a substantially cylindrical hollow body;
   b) a chuck drive spindle journalled in said body and defining therebetween an annular space;
   c) means limiting axial movement of said spindle in said body towards said gearbox;
   d) a rotary ratchet plate fixed on said spindle;
   e) a facing, rotationally fixed ratchet plate in said body;
   f) means to engage said ratchet plates together such that on rotation of the spindle a reciprocating action is imposed thereon, said means to engage including a lever projecting through a slot in said body;
   g) resiliently biased, adjustable actuating means mounted on said body to selectively engage said torque control clutch ring, said lever projecting through said actuating means.

2. A power tool as claimed in claim 1 in which said engaging means comprises a cam ring against which said rotationally fixed ratchet plate is pressed, said rotationally fixed ratchet plate and cam ring having facing cams such that, in a first angular position of said cam ring with respect to said rotationally fixed ratchet plate, the rotationally fixed ratchet plate is displaced by said cam ring towards said rotary ratchet plate enabling engagement therebetween.

3. A power tool as claimed in claim 2, said body comprises an end cap, wherein said cam ring is supported against said end cap.

4. A power tool as claimed in claim 3, in which said end cap and cam ring include detent means whereby said cam ring is engaged in one of said first position and a second angular position in which said rotationally fixed ratchet plate is permitted by said cam ring to be displaced away from said rotary ratchet plate preventing engagement therebetween.

5. A power tool as claimed in claim 2, in which said rotationally fixed ratchet plate is pressed towards said cam ring by spring means in the body.

6. A power tool as claimed in claim 1; in which said actuating means comprises a plurality of elements disposed in bores around said body and pressed by a plurality of springs spaced around an outside of the body, and said lever projects between two of said springs.

7. A power tool as claimed in claim 6, in which said springs are carried by a carrier ring disposed on the body, said carrier ring being axially movable and rotationally locked on said body, a control ring being threaded on said body and actuable to displace axially said carrier ring.

8. A power tool as claimed in claim 6, in which said springs are carried by a carrier ring disposed on the body, said carrier ring being axially movable and rotationally locked on said body, a control ring being threaded on said body and actuable to displace axially said carrier ring, and in which said carrier ring and control ring have a series of mutually engaging detents about respective peripheries thereof to locate the control ring in discrete angular positions with respect to the carrier ring.

9. A power tool as claimed in claim 6, in which said springs and elements correspond in number and each spring acts directly on each element.

10. A power tool as claimed in claim 6, in which said elements are balls.

* * * * *